(12) United States Patent
Wong et al.

(10) Patent No.: US 9,472,841 B2
(45) Date of Patent: *Oct. 18, 2016

(54) RF RADIATION REDIRECTION AWAY FROM PORTABLE COMMUNICATION DEVICE USER

(71) Applicant: ANTENNA79, INC., Encinitas, CA (US)

(72) Inventors: Alfred Y. Wong, Los Angeles, CA (US); Robert Moreno, Acton, CA (US); Karl Richard Shields, North Hills, CA (US); Rong Wang, Sherman Oaks, CA (US)

(73) Assignee: Antenna79, Inc., Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,775

(22) Filed: Nov. 24, 2014

(65) Prior Publication Data

US 2015/0077295 A1    Mar. 19, 2015

Related U.S. Application Data

(63) Continuation of application No. 13/492,518, filed on Jun. 8, 2012, now Pat. No. 8,897,843, which is a continuation of application No. 12/724,290, filed on Mar. 15, 2010, now Pat. No. 8,214,003, which is a (Continued)

(51) Int. Cl.
*H04M 1/00*   (2006.01)
*H01Q 1/24*   (2006.01)
(Continued)

(52) U.S. Cl.
CPC .............. *H01Q 1/243* (2013.01); *H01Q 1/245*
(2013.01); *H01Q 7/00* (2013.01); *H01Q 9/0407* (2013.01); *H01Q 19/005* (2013.01); *H01Q 19/28* (2013.01)

(58) Field of Classification Search
CPC .... H01Q 19/005; H01Q 19/28; H01Q 1/243; H01Q 1/245; H01Q 7/00; H01Q 9/0407
USPC .............. 455/575.7, 289, 280, 575, 90, 129, 455/562.1, 97, 550.1, 90.3, 19, 66.1, 558; 343/702, 700, 814, 815, 841, 745; 434/702, 841, 790
See application file for complete search history.

(56) References Cited

U.S. PATENT DOCUMENTS

| 3,778,836 A | 12/1973 | Tanaka |
| 5,278,571 A | 1/1994 | Helfrick |

(Continued)

FOREIGN PATENT DOCUMENTS

| CN | 1507674 A | 6/2004 |
| CN | 1918745 A | 2/2007 |

(Continued)

OTHER PUBLICATIONS

First Office Action for Chinese Application No. 201280064893.5, mailed Jun. 3, 2015.

(Continued)

*Primary Examiner* — Tan H Trinh

(57) ABSTRACT

A case for a wireless device includes a number of RF coupling elements mounted in the case and configured such that RF radiation is coupled from an internal antenna of the wireless device out of the device to a first RF coupling element, and from the first RF coupling element to a RF redirector coupling element that redirects the RF radiation in a direction outward from said wireless device that is opposite to a user side of the wireless device. A corrugated metallic shield is optionally provided on an opposite side of the case, facing a user of the device.

20 Claims, 11 Drawing Sheets

Reference - iPhone Model

Related U.S. Application Data continuation-in-part of application No. 12/614,132, filed on Nov. 6, 2009, now Pat. No. 8,208,980.

(60) Provisional application No. 61/160,282, filed on Mar. 13, 2009, provisional application No. 61/112,141, filed on Nov. 6, 2008, provisional application No. 61/158,551, filed on Mar. 9, 2009.

(51) Int. Cl.
  *H01Q 19/00* (2006.01)
  *H01Q 19/28* (2006.01)
  *H01Q 7/00* (2006.01)
  *H01Q 9/04* (2006.01)

(56) References Cited

U.S. PATENT DOCUMENTS

| | | | |
|---|---|---|---|
| 5,338,896 A | 8/1994 | Danforth | |
| 5,550,552 A | 8/1996 | Oxley | |
| 5,711,014 A | 1/1998 | Crowley et al. | |
| 5,726,383 A | 3/1998 | Geller et al. | |
| 5,777,261 A | 7/1998 | Katz | |
| 5,787,340 A | 7/1998 | Sepponen | |
| 5,826,201 A * | 10/1998 | Gratias | 455/575.5 |
| 6,031,495 A | 2/2000 | Simmons et al. | |
| 6,049,310 A * | 4/2000 | Sadahiro | 343/702 |
| 6,082,535 A | 7/2000 | Mitchell | |
| 6,095,820 A * | 8/2000 | Luxon et al. | 343/702 |
| 6,249,256 B1 * | 6/2001 | Luxon et al. | 343/702 |
| 6,341,217 B1 | 1/2002 | Wong | |
| 6,359,213 B1 | 3/2002 | Long | |
| 6,466,173 B1 * | 10/2002 | Li | H01Q 1/244 343/702 |
| 6,492,957 B2 | 12/2002 | Carillo, Jr. et al. | |
| 6,515,223 B2 | 2/2003 | Tashjian | |
| 6,568,576 B1 | 5/2003 | Godshaw et al. | |
| 6,576,832 B2 | 6/2003 | Svarfvar et al. | |
| 6,603,430 B1 | 8/2003 | Hill et al. | |
| 6,603,981 B1 | 8/2003 | Carillo, Jr. et al. | |
| 6,615,026 B1 | 9/2003 | Wong | |
| 6,677,906 B2 | 1/2004 | Quinn et al. | |
| 6,711,387 B1 | 3/2004 | Lungley | |
| 6,768,523 B2 | 7/2004 | Cheng et al. | |
| 6,850,785 B1 | 2/2005 | Leyten | |
| 6,855,883 B1 | 2/2005 | Matsui | |
| 6,856,819 B2 | 2/2005 | Itoh | |
| 6,871,079 B1 * | 3/2005 | Choi et al. | 455/550.1 |
| 6,880,737 B2 | 4/2005 | Bauer | |
| 6,924,770 B2 | 8/2005 | Carpenter et al. | |
| 6,947,000 B2 | 9/2005 | Ito | |
| 6,950,674 B2 | 9/2005 | Jarrett | |
| 6,980,777 B2 | 12/2005 | Shepherd et al. | |
| 6,985,110 B2 | 1/2006 | Tanaka et al. | |
| 7,031,762 B2 | 4/2006 | Shoji et al. | |
| 7,065,379 B1 | 6/2006 | Kim et al. | |
| 7,164,933 B1 | 1/2007 | Steigerwald et al. | |
| 7,202,825 B2 | 4/2007 | Leizerovich et al. | |
| 7,203,533 B1 | 4/2007 | Tischer | |
| 7,206,618 B2 | 4/2007 | Latto | |
| 7,230,574 B2 | 6/2007 | Johnson | |
| 7,327,841 B2 | 2/2008 | Schreiber et al. | |
| 7,369,879 B1 * | 5/2008 | Steigerwald et al. | 455/562.1 |
| 7,494,069 B2 | 2/2009 | Shimada | |
| 7,541,986 B2 | 6/2009 | Park | |
| 7,812,770 B2 | 10/2010 | Qi et al. | |
| 8,068,061 B2 | 11/2011 | Qi et al. | |
| 8,208,980 B2 | 6/2012 | Wong et al. | |
| 8,214,003 B2 | 7/2012 | Wong et al. | |
| 8,325,094 B2 | 12/2012 | Ayala Vazquez et al. | |
| 8,442,602 B2 | 5/2013 | Wong et al. | |
| 8,629,650 B2 * | 1/2014 | Mohammadian et al. | 320/108 |
| 8,648,752 B2 * | 2/2014 | Ramachandran et al. | 343/702 |
| 8,681,049 B2 | 3/2014 | Su et al. | |
| 8,738,103 B2 * | 5/2014 | Puente Baliarda et al. | 455/575.7 |
| 8,750,948 B2 | 6/2014 | Wong et al. | |
| 8,897,843 B2 | 11/2014 | Wong et al. | |
| 8,957,813 B2 | 2/2015 | McCaughey et al. | |
| 9,112,584 B2 | 8/2015 | McCaughey et al. | |
| 2002/0009976 A1 | 1/2002 | Rashidi | |
| 2002/0074142 A1 | 6/2002 | Katz | |
| 2002/0140611 A1 * | 10/2002 | Ligander | H01Q 9/0407 343/700 MS |
| 2002/0183013 A1 | 12/2002 | Auckland et al. | |
| 2002/0193136 A1 | 12/2002 | Halkosaari et al. | |
| 2003/0076262 A1 * | 4/2003 | Forrester et al. | 343/700 MS |
| 2003/0078037 A1 | 4/2003 | Auckland et al. | |
| 2003/0128166 A1 * | 7/2003 | Bakker | H01Q 1/22 343/702 |
| 2004/0014506 A1 | 1/2004 | Kemppinen | |
| 2005/0079820 A1 | 4/2005 | Yamashita | |
| 2005/0104782 A1 | 5/2005 | Peled et al. | |
| 2005/0195119 A1 | 9/2005 | Gaucher et al. | |
| 2005/0226353 A1 | 10/2005 | Gebara et al. | |
| 2006/0019696 A1 | 1/2006 | Brunel et al. | |
| 2006/0022889 A1 | 2/2006 | Chiang et al. | |
| 2006/0055605 A1 * | 3/2006 | Peled | H01Q 1/242 343/702 |
| 2006/0232477 A1 * | 10/2006 | Ollikainen | 343/700 MS |
| 2006/0232483 A1 | 10/2006 | Iwai et al. | |
| 2006/0290575 A1 | 12/2006 | Pelzer | |
| 2007/0004456 A1 * | 1/2007 | Shimada | 455/558 |
| 2007/0013589 A1 * | 1/2007 | Park et al. | 343/702 |
| 2007/0057851 A1 | 3/2007 | Leizerovich et al. | |
| 2007/0164908 A1 * | 7/2007 | Turchinetz et al. | 343/700 MS |
| 2007/0241977 A1 * | 10/2007 | Vance | 343/745 |
| 2008/0007468 A1 | 1/2008 | Sato et al. | |
| 2008/0165064 A1 | 7/2008 | Hill et al. | |
| 2008/0316111 A1 | 12/2008 | Aoyama et al. | |
| 2009/0124215 A1 | 5/2009 | Nysen | |
| 2009/0156151 A1 * | 6/2009 | Anguera et al. | 455/289 |
| 2009/0207092 A1 * | 8/2009 | Nysen et al. | 343/876 |
| 2009/0289737 A1 | 11/2009 | Itoh et al. | |
| 2009/0318094 A1 | 12/2009 | Pros et al. | |
| 2010/0033383 A1 | 2/2010 | Yamamoto | |
| 2010/0078343 A1 | 4/2010 | Hoellwarth et al. | |
| 2010/0097286 A1 | 4/2010 | Morrow et al. | |
| 2010/0113111 A1 | 5/2010 | Wong et al. | |
| 2010/0214180 A1 | 8/2010 | Krogerus | |
| 2010/0216520 A1 | 8/2010 | Lee | |
| 2010/0234081 A1 | 9/2010 | Wong et al. | |
| 2010/0291965 A1 | 11/2010 | Tabe | |
| 2011/0012794 A1 | 1/2011 | Schlub | |
| 2011/0036912 A1 | 2/2011 | Guo et al. | |
| 2011/0109515 A1 | 5/2011 | Rao | |
| 2011/0140982 A1 | 6/2011 | Ozden et al. | |
| 2012/0044115 A1 | 2/2012 | McCaughey et al. | |
| 2012/0074231 A1 | 3/2012 | Jain et al. | |
| 2012/0129579 A1 | 5/2012 | Tam | |
| 2012/0242549 A1 | 9/2012 | Wong et al. | |
| 2012/0309472 A1 | 12/2012 | Wong et al. | |
| 2013/0109435 A1 | 5/2013 | McCaughey et al. | |
| 2013/0252677 A1 | 9/2013 | Wong et al. | |
| 2013/0286582 A1 | 10/2013 | Dabov et al. | |
| 2014/0057686 A1 | 2/2014 | McCaughey et al. | |
| 2014/0287697 A1 | 9/2014 | Wong et al. | |
| 2015/0141089 A1 | 5/2015 | McCaughey et al. | |
| 2016/0036481 A1 | 2/2016 | McCaughey et al. | |

FOREIGN PATENT DOCUMENTS

| | | |
|---|---|---|
| CN | 101639741 A | 2/2010 |
| CN | 102130371 | 7/2011 |
| EP | 1 098 388 A1 | 5/2001 |
| EP | 1 292 042 A2 | 3/2003 |
| EP | 1 835 562 A1 | 9/2007 |
| EP | 1 942 580 A2 | 7/2008 |
| WO | WO 00/13330 | 3/2000 |
| WO | WO 01/35487 A1 | 5/2001 |
| WO | WO 02/095867 A1 | 11/2002 |
| WO | WO 03/028424 A1 | 4/2003 |

(56) References Cited

OTHER PUBLICATIONS

Office Action for U.S. Appl. No. 12/614,132, mailed Oct. 20, 2011.
Final Office Action for U.S. Appl. No. 12/614,132, mailed Mar. 1, 2012.
Office Action for U.S. Appl. No. 12/724,290, mailed Nov. 9, 2011.
Office Action for U.S. Appl. No. 13/491,747, mailed Sep. 7, 2012.
Office Action for U.S. Appl. No. 13/894,039, mailed Jul. 25, 2013.
Office Action for U.S. Appl. No. 13/894,039, mailed Jan. 13, 2014.
International Search Report and Written Opinion for International Application No. PCT/US2009/063618, mailed Mar. 1, 2010.
Patent Examination Report No. 1 for Australian Application No. 2009313338, mailed Mar. 6, 2013.
International Search Report and Written Opinion for International Application No. PCT/US2012/062995, mailed Mar. 8, 2013.
First Office Action for Chinese Application No. 200910221262.X, issued May 3, 2013.
Second Office Action for Chinese Application No. 200910221262.X, issued Nov. 22, 2013.
Third Office Action for Chinese Application No. 200910221262.X, mailed Mar. 27, 2014.
Patent Examination Report No. 2 for Australian Application No. 2009313338, mailed Mar. 11, 2014.
Office Action for U.S. Appl. No. 13/287,680, mailed Apr. 2, 2014.
Office Action for U.S. Appl. No. 13/492,518, mailed Mar. 21, 2014.
Office Action for U.S. Appl. No. 14/071,197, mailed Mar. 20, 2014.
Final Office Action for U.S. Appl. No. 14/071,197, mailed Aug. 18, 2014.
Fourth Office Action for Chinese Application No. 200910221262.X, mailed Oct. 17, 2014.
Office Action for U.S. Appl. No. 14/297,162, mailed Feb. 10, 2015.
International Search Report and Written Opinion for International Application No. PCT/US2014/063665, mailed Feb. 4, 2015.
"Defender Series for Nokia E72 Protection that Works" Dec. 31, 2010, Retrieved from the Internet: <URL: http://www.techbuy.com.au/images/addi/13/File1315854598.pdf> [retrieved on May 7, 2015], 1 page & "Otterbox Nokia E71 E71x Defender Series Case—Original (OEM) NOK2-371XX-20-C50TR . . . A," Dec. 31, 2010, Retrieved from the Internet: <URL:https://www.youtube.com/watch?v=tDrVce-jaGY] [retrieved on May 7, 2015].
Office Action for U.S. Appl. No. 14/071,197, mailed May 26, 2015.
Extended Search Report for European Application No. 12846415.3, mailed May 15, 2015.
Final Office Action for U.S. Appl. No. 14/071,197, mailed Dec. 17, 2015.
Patent Examination Report No. 1 for Australian Application No. 2013205781, mailed Jul. 22, 2015.

Patent Examination Report No. 2 for Australian Application No. 2013205781, mailed Aug. 10, 2015.
Patent Examination Report No. 1 for Australian Application No. 2013205780, mailed Jul. 22, 2015.
Patent Examination Report No. 2 for Australian Application No. 2013205780, mailed Aug. 10, 2015.
Patent Examination Report No. 1 for Australian Application No. 2014203148, mailed Jan. 20, 2016.
Patent Examination Report No. 1 for Australian Application No. 2012332484, mailed Feb. 17, 2016.
Siegler, MG., "TechCrunch Review—The iPad 2: Yeah, You're Gonna Want One," TechCrunch, published on Mar. 9, 2011 [retrieved from the internet on Apr. 5, 2016] <URL: http//techcrunch.com/2011/03/09/ipad-2-review/>, 22 pages.
Patent Examination Report No. 2 for Australian Application No. 2012332484, mailed Apr. 8, 2016.
Office Action for Canadian Application No. 2,754,116, mailed Feb. 15, 2016.
Partial Search Report for European Application No. 09825512.8, mailed Jan. 29, 2016.
Second Office Action for Chinese Application No. 201280064893.5, mailed Feb. 19, 2016.
Macgyml: "iPhone 4 Defender case proximity sensor fix," Retrieved from the Internet <URL: https://www.youtube.com/watch?v=TtQvE2yUmME> [retrieved on May 27, 2016], YouTube, May 6, 2011, 1 pg.
Hoffman, Robert: "Otterbox defender work around for white iPhone 4," Retrieved from the Internet <URL: https://www.youtube.com/watch?v+tU5QKw4MfeA>, [retrieved on May 27, 2016], YouTube, Jun. 21, 2011, 6 pages.
Android Forums: "Otterbox case disables proximity sensor," Retrieved from the Internet <URL: http://androidforums.com/threads/otterbox-ease-disables-proximity-sensor.53238/> [retrieved on May 26, 2016], May 22, 2011, 8 pages.
Metaphoric Labs: "How to kill your iPhone with the wrong case," Retrieved from the Internet <URL: http://www.metaphoriclabs.com/articles/how-to-kill-your-iphone-with-the-wrong-case/> [retrieved on May 26, 2016], May 15, 2008, 3 pages.
Otterbox: "Defender Series Apple iPhone 4," Retrieved from the Internet <URL: https://datorclax.se/info_sheets/OTT-107.pdf> [retrieved on May 27, 2016], Nov. 6, 2010, 1 page.
Extended Search Report for European Application No. 09825512.8, mailed May 20, 2016.
Examination Report for European Application No. 12846415.3, mailed Jun. 7, 2016.

* cited by examiner

RF RADIATION REDIRECTION AWAY FROM PORTABLE COMMUNICATION DEVICE USER

CROSS REFERENCE TO RELATED APPLICATIONS AND CLAIM FOR PRIORITY

This application is a continuation of U.S. patent application Ser. No. 13/492,518, entitled "RF RADIATION REDIRECTION AWAY FROM PORTABLE COMMUNICATION DEVICE USER," filed on Jun. 8, 2012, (now U.S. Pat. No. 8,897,843), which is a continuation of U.S. patent application Ser. No. 12/724,290, entitled "RF RADIATION REDIRECTION AWAY FROM PORTABLE COMMUNICATION DEVICE USER," filed on Mar. 15, 2010 (now U.S. Pat. No. 8,214,003), which claims priority to and the benefit of Provisional Application No. 61/160,282, filed Mar. 13, 2009, all of which are incorporated herein by reference in their entirety.

U.S. patent application Ser. No. 12/724,290 is also a continuation-in-part of U.S. patent application Ser. No. 12/614,132, filed Nov. 6, 2009 (now U.S. Pat. No. 8,208,980), which claims priority to and the benefit of U.S. Provisional Application No. 61/112,141, filed Nov. 6, 2008 and U.S. Provisional Application No. 61/158,551, filed Mar. 9, 2009, all of which are incorporated herein by reference in their entirety.

BACKGROUND OF THE INVENTION

1. Field of the Invention

This invention relates generally to portable communication devices such as cell phones, smart phones and similar handheld devices, and improvements thereto. In particular, this invention provides improvements in antennas and RF shielding of such devices, facing a direction away from the user, to redirecting RF radiation away from the body of a user.

2. Background

Design requirements of cellular phones and smart phones are placing an ever increasing premium on the available space within these devices as their functions become more diverse, ranging from the original basic function as a wireless telephone to a music player, video player, handheld computer, wireless internet device for browsing the web, retrieving email and downloading or uploading files, a still camera, a video camera, a GPS device, a navigation system, etc. These functions bring with them greatly increased demands upon the antenna and generally require more radiation power for transmission, which must serve up to five frequency bands while occupying less space than ever before available for the antenna.

In addition, RF radiation from mobile phones is becoming of greater concern as a health risk, and addressing this issue in the design of the antenna while the space within the phone is reduced poses a particularly difficult challenge, as the only effective methods of significantly reducing RF radiation in the direction of the user, while allowing full power RF signal away from the user, require some additional space for the antenna.

The FCC requires limiting the radiation from a portable communication device (such as a mobile or cellular telephone) that is directed towards a user's head (Specific Absorption Rate, or SAR). Each year the FCC tends to lower the permitted level further. One of the reasons is safety. At the same time, as wireless communications technology advances, the mobile phone device has taken on the function of a hand-held computer with more data-intensive functions, requiring high rates of data transfer between the cell phone and the base station tower. It would be beneficial to the improved function of cell phones to be able to increase the power output of the antenna, but FCC regulations will not allow increased SAR.

The Smart Phone (e.g. iPhone, BlackBerry, etc.), for example, has an internal antenna(s) located at both the lower and upper parts of the phone, bordering the display area. The space for an antenna is usually limited to 1 cm times the width and thickness of the phone. The antenna is situated close to the back surface of the phone, on the side opposite to the user.

SUMMARY OF THE INVENTION

According to a first embodiment, a method of coupling radiation from the antenna inside a wireless phone to a location outside the device where the distribution of radiation can be better managed. It presents several methods of directing RF radiation away from the user's head by the appropriate placement of metallic loops, directors and other parasitic elements. This can take the form of arrays of monopole and dipole antennas, conducting loops and conducting plates with insulators or dielectrics. The general concept is to couple the radiation from the internal antenna on the side facing the user to the opposite side to direct such radiation outward away from the user.

DETAILED DESCRIPTION OF THE INVENTION

In one preferred embodiment of the invention, external coupling antennas are provided to couple radiation from the internal antenna of a wireless device and to redirect the radiation such that there is minimum radiation towards the user and maximum radiation away from the user. It is important to note that this coupling method does not require an actual physical connection between the external coupling antennas and the antenna internal to the phone. However the position of the coupling antenna with respect to the internal antenna is critical. Through a series of coupling loops, directing elements or patch antennas located on a cover or case, a "clip" structure, or directly on an external surface of the mobile device, the radiation is further directed away from the user's head (which is absorptive) to the environment for communication to cell towers.

The materials used for coupling and re-directional elements are generally made out of materials of high electrical conductivity. However dielectric materials are also used to achieve optimal physical sizes and spacing of various elements.

The above methodology is illustrated by the treatment of two exemplary wireless devices—the Apple 3G iPhone and the RIM Blackberry Curve 8300. However the procedure is perfectly general and can be applied to any wireless device using different combinations of the elements described.

Figure 1:
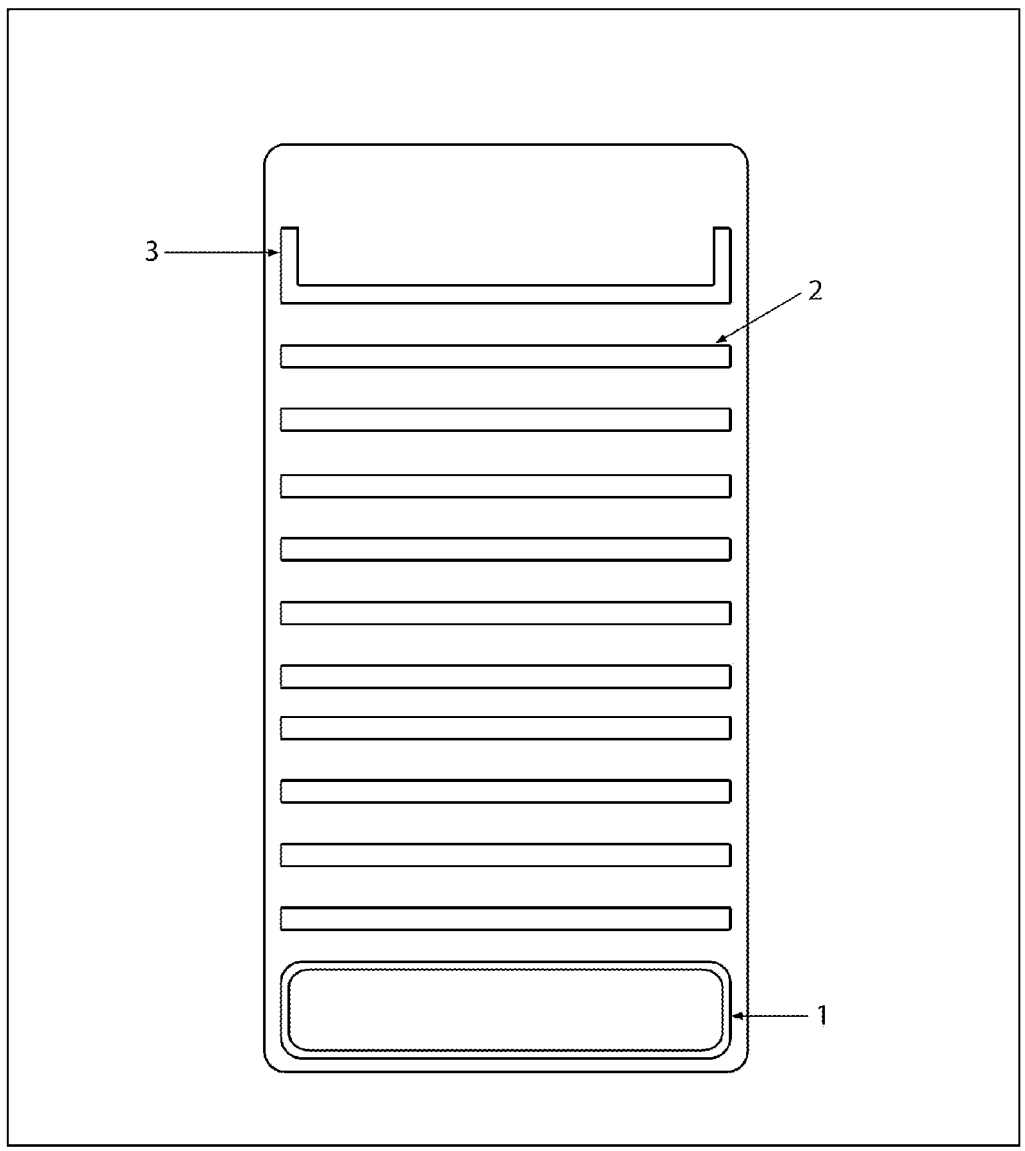
FIG. 1 shows RF coupling elements mounted on the back of a mobile telephone.
Figure 2:
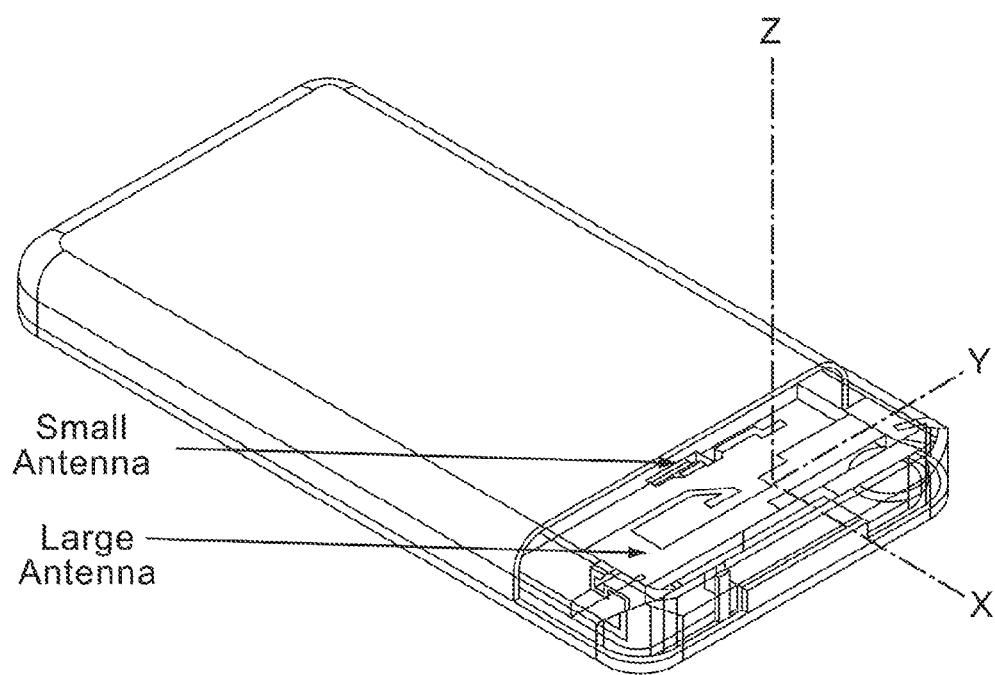
FIG. 2 shows a perspective view of a mobile telephone with placement of small and large antennas.

Referring to FIG. 1, the radiation from an internal antenna (not shown) is directed away from the user and outward at the back of the phone through a coupling loop 1 mounted on the back of the phone. The coupling is achieved through electromagnetic (EM) induction as revealed by laboratory experiments and computer modeling of various physical quantities (antennas, connectors, circuit elements, ground planes, etc.) inside a mobile communication device such as an Apple iPhone, as illustrated in FIG. 2. The EM fields are then successively coupled up a "ladder" of metallic strips 2 up the backside of the iPhone enclosed inside the case. The placement of the coupling loop 1 with respect to the antenna inside the mobile device is critical. As shown, the horizontal metallic strips may be straight, or may have regular or irregular shapes such as "U" shaped metallic element 3, whose dimensions are adjusted to fit the available space on the back of the phone, while achieving optimal coupling from the loop 1.

Figure 3:
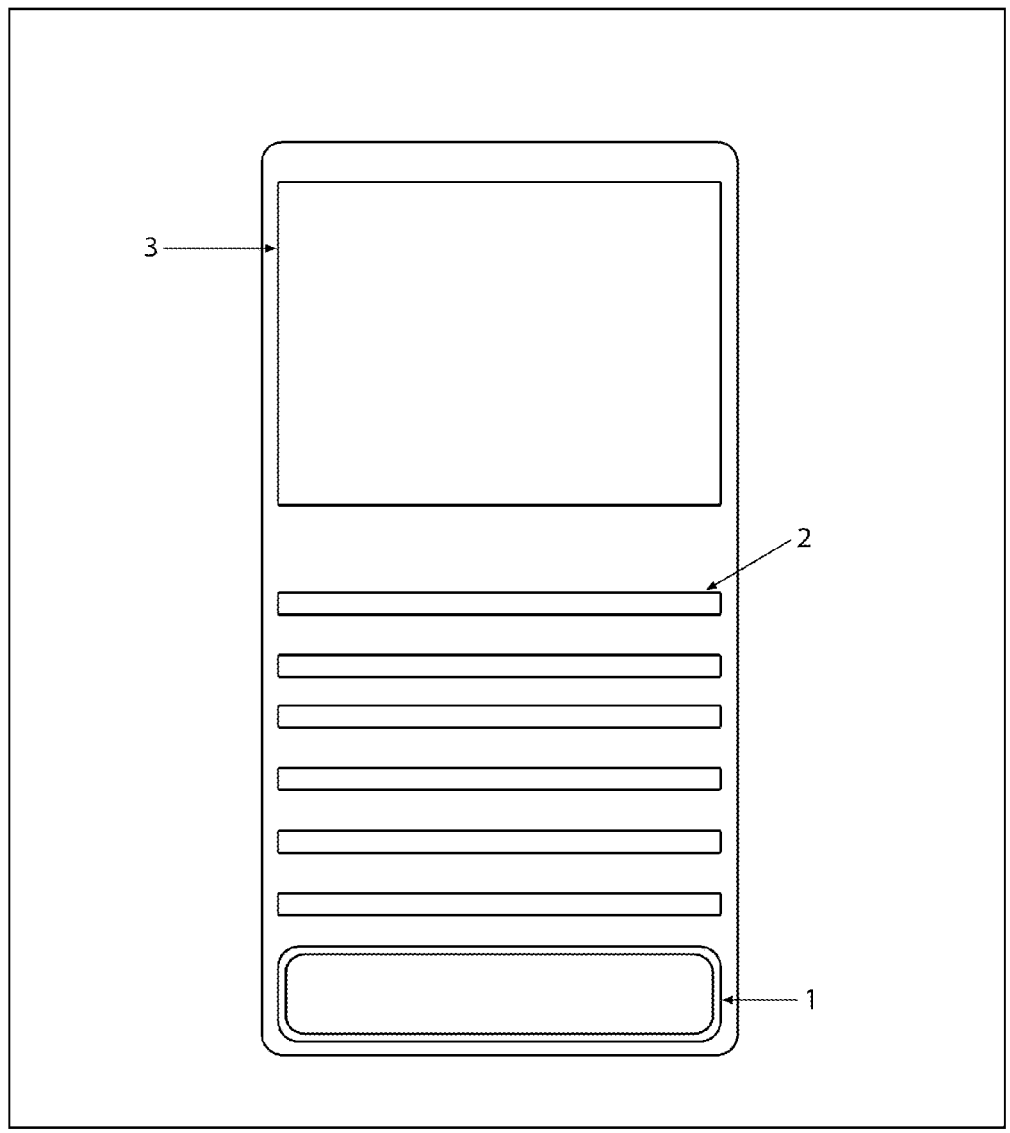
FIG. 3 shows an RF loop over an internal antenna of a mobile telephone.

One variation of the above design is in the replacement of an uppermost radiation re-director by a single plate 3 as illustrated in FIG. 3. The use of a plate resembles a patch antenna whose radiation pattern favors the outward direction away from the user. The loop 1 couples power out from the internal antenna, then the directors 2 couple the power up to the plate 3, from which the radiation is directed outward from the phone in the direction opposite to the user's head.

Figure 4:
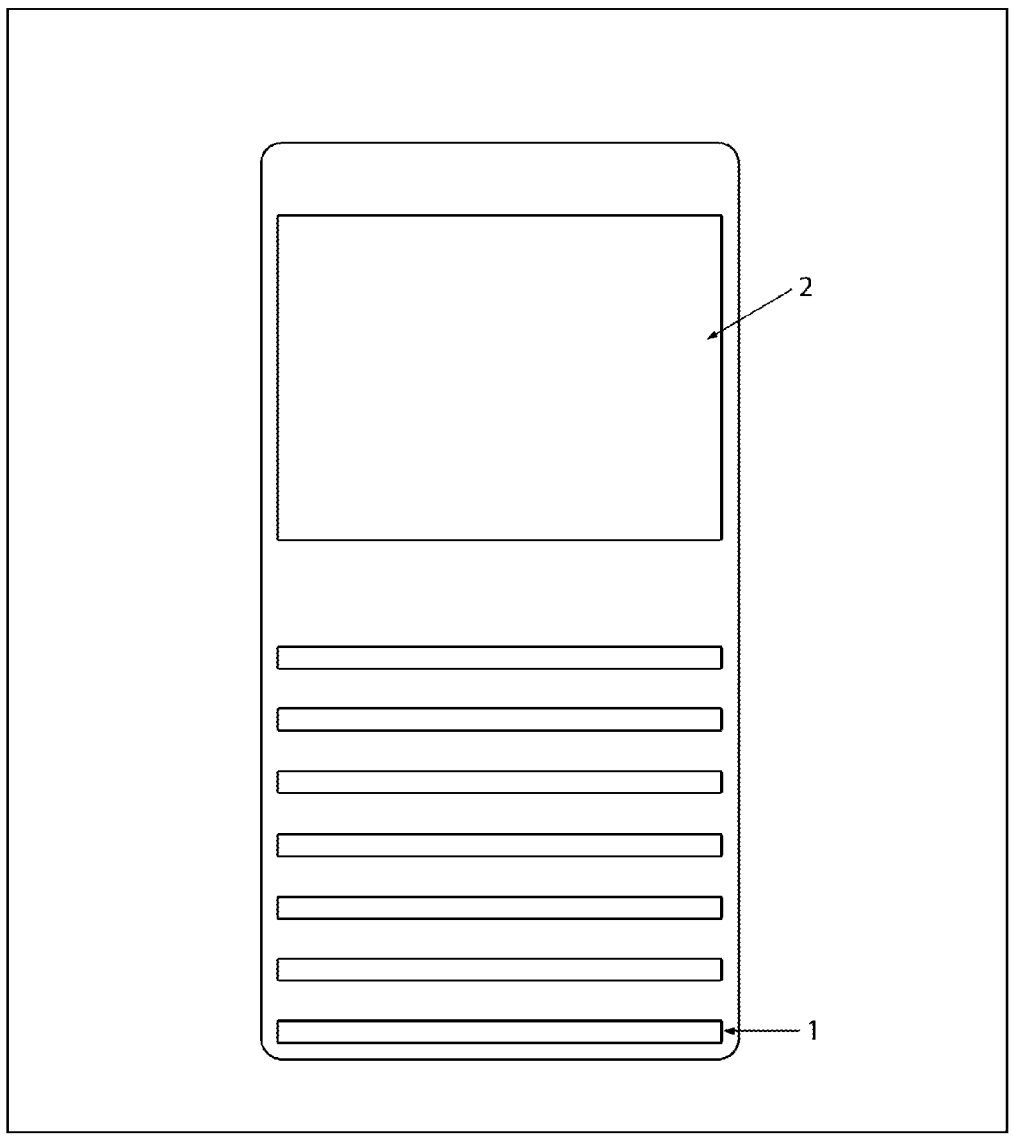
FIG. 4 shows an RF coupling parasitic device mounted on the back of a mobile telephone.
Figure 5:
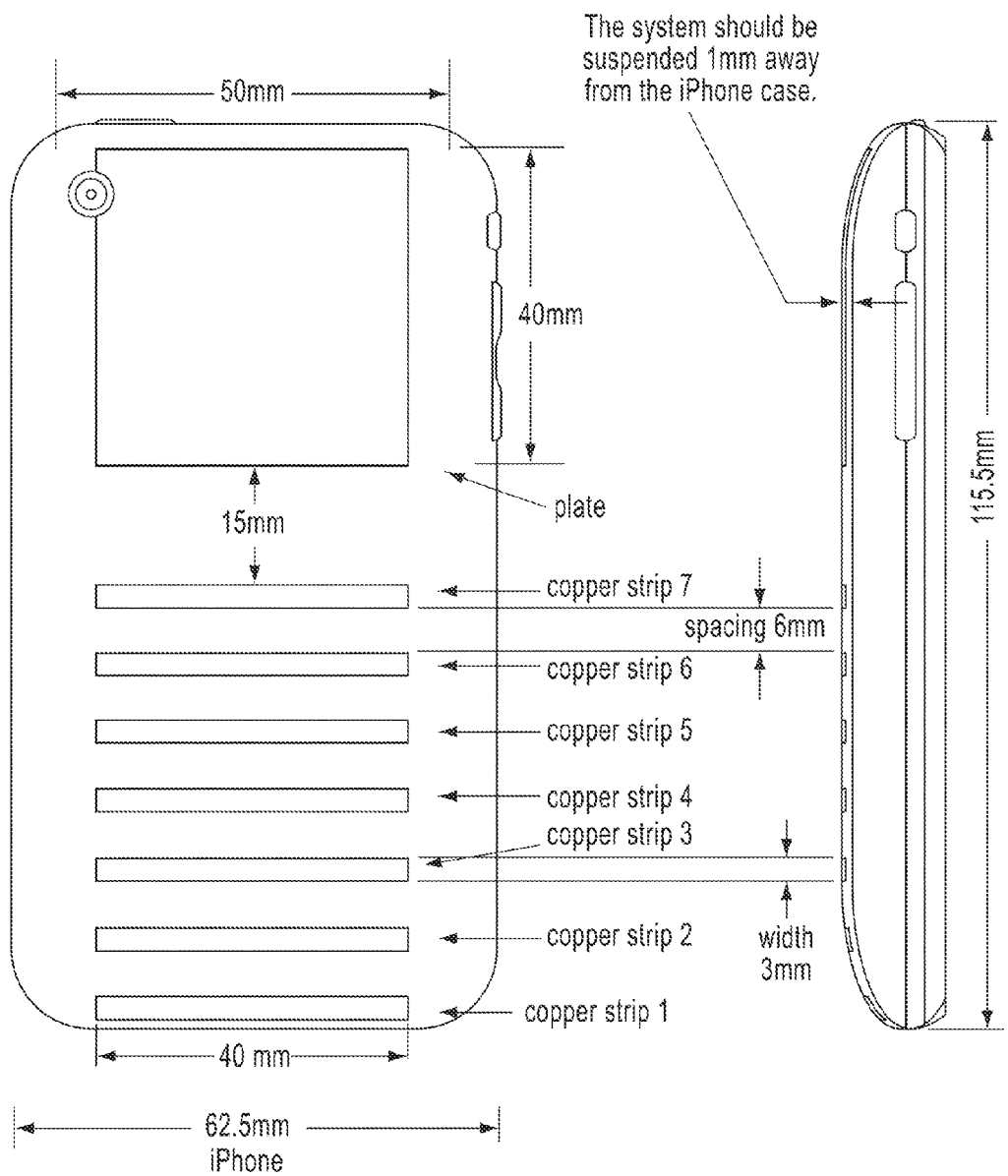
FIG. 5 shows a front and side view of a "ladder and plate" RF coupling design for a mobile telephone.

Another variation, illustrated in FIG. 4, as well as in FIG. 5, which depicts an application of this design to the Apple iPhone 3G, is the replacement of the coupling loop by an RF coupling parasitic redirector composed of horizontal strips 1 that form a ladder-like array leading to a rectangular plate 2 above the ladder. All these configurations have been tested and shown to significantly reduce the amount of radiation directed towards a user while maintaining or even enhancing the total radiation power of the cell phone.

Figure 6:
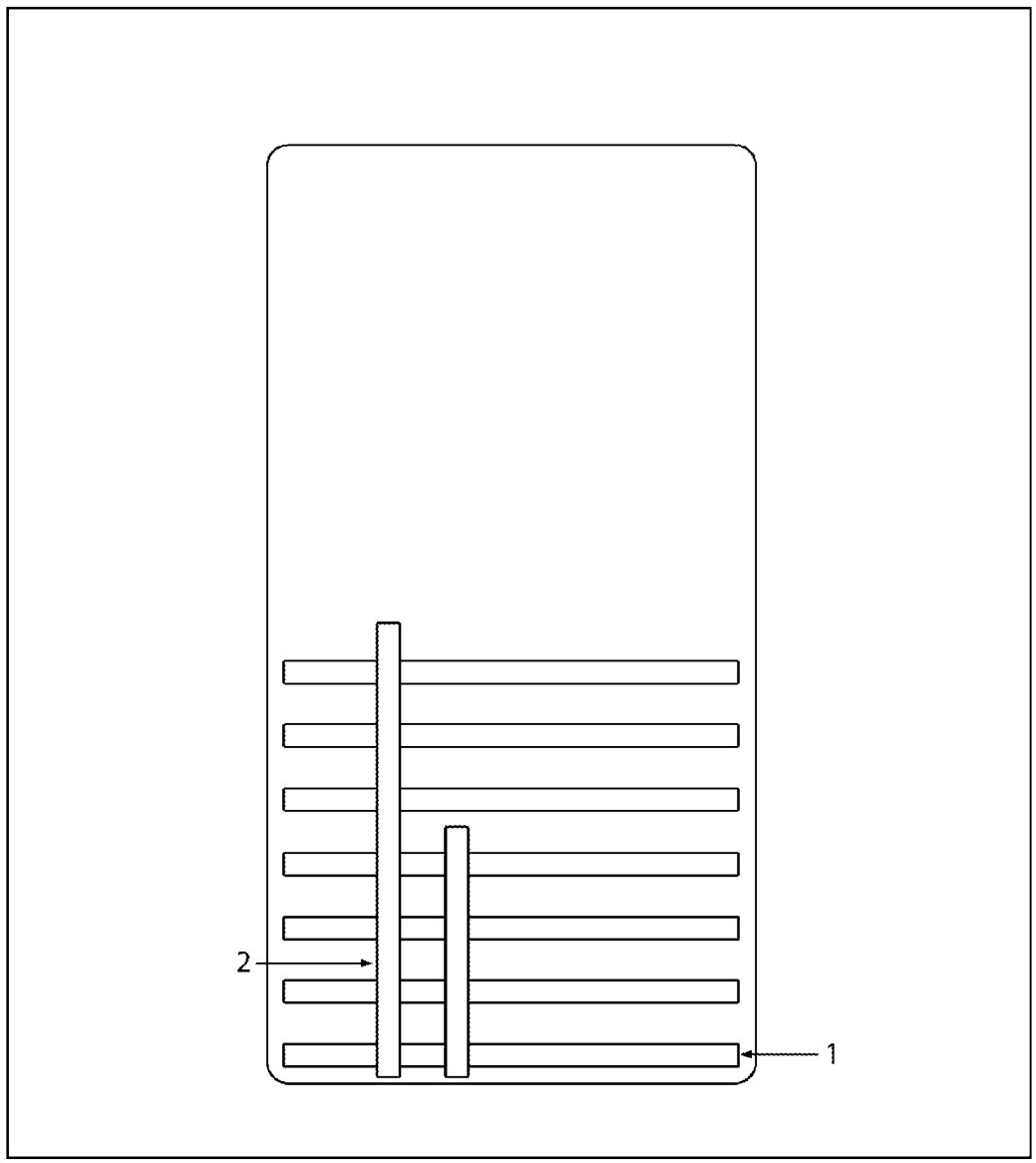
FIG. 6 shows an alternate embodiment of an RC coupling parasitic device mounted on the back of a mobile telephone.

A further embodiment is the use of vertical strips 2 that are orthogonal to the horizontal strips 1, as shown in FIG. 6. These vertical strips couple to a vertical polarization of the radiation from the internal cell phone antenna. The purpose is to couple to both polarizations to fully redirect the maximum amount of RF radiation from the cell phone antenna away from the direction of the user. The vertical strips 2 are placed in a layer above the horizontal strips such that they provide additional coupling with any corresponding vertical elements of the internal antenna.

Figure 7:
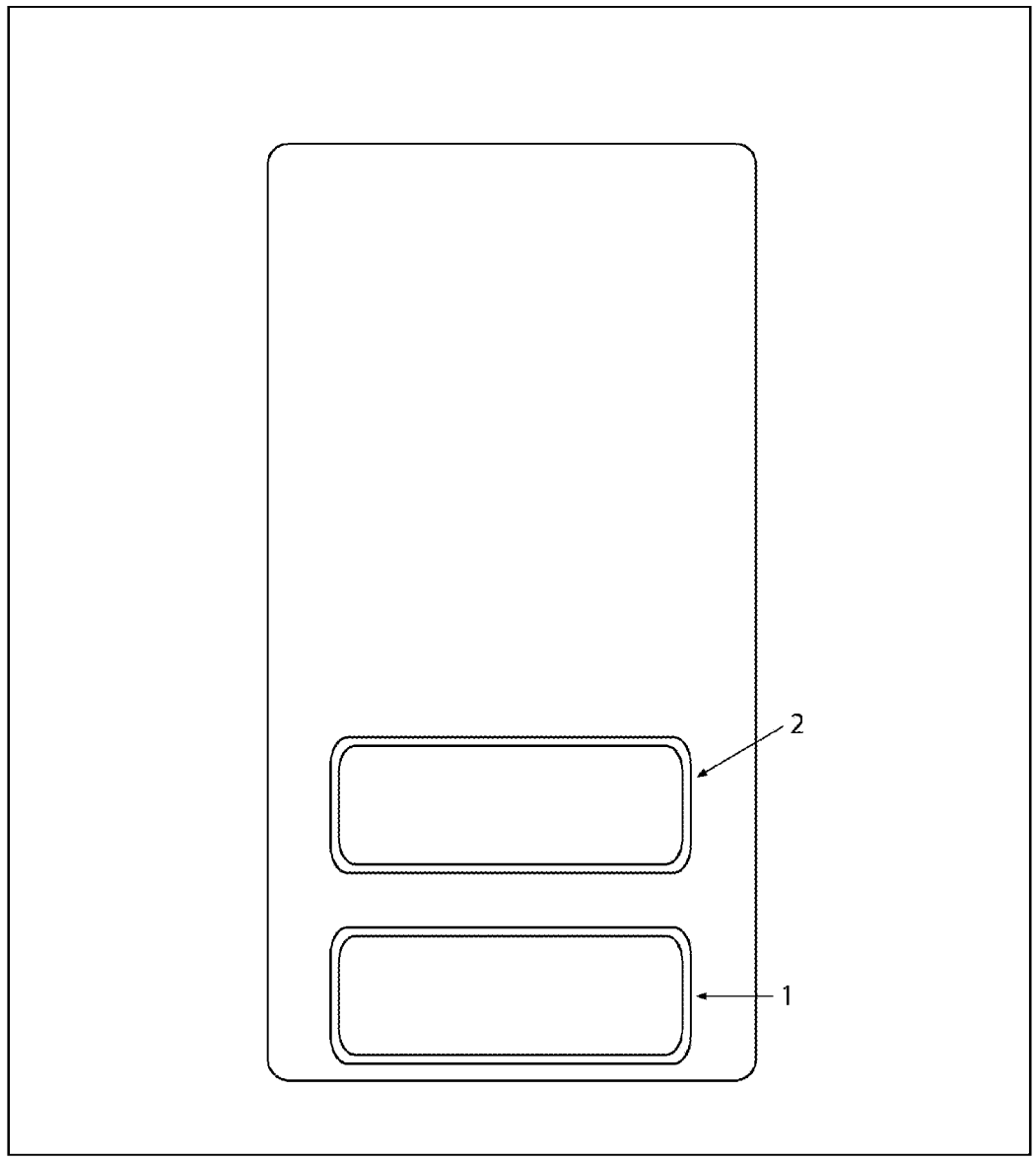
FIG. 7 shows a pair of RF coupling devices in the form of first and second loops mounted on the back of a mobile telephone.
Figure 8:
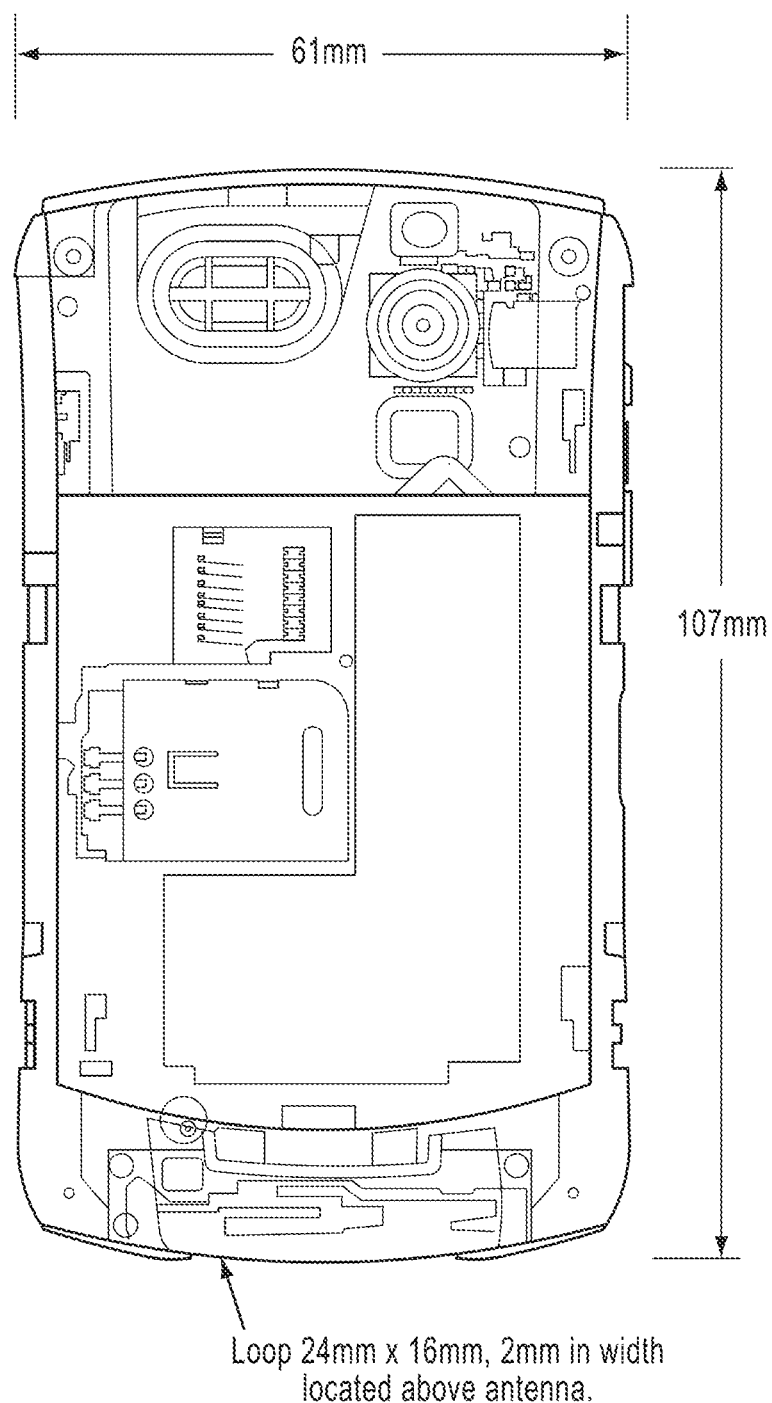
FIG. 8 shows a partial phantom view of an RF coupling loop design where the loop is mounted above the internal antenna of a mobile telephone.

For some wireless communication devices, such as the Blackberry 8300 shown in FIG. 8, the internal components of the phone require a simpler approach as illustrated in FIG. 7, where a single loop 1 is placed over the location of the internal antenna, and may be augmented by a second loop 2 above the first loop 1. The first loop 1 couples the RF field from the internal antenna, and the second loop 2 provides additional redirected radiation away from the user. Size and spacing are tuned to the particular phone. For the Blackberry 8300, a loop of 24 mm×16 mm×2 mm is placed such that it wraps under the bottom of the phone by 2 mm as shown in FIG. 8. This configuration produces ideal results as verified by independent laboratory testing by Cetecom in Milpitas, Calif.

Figure 9:
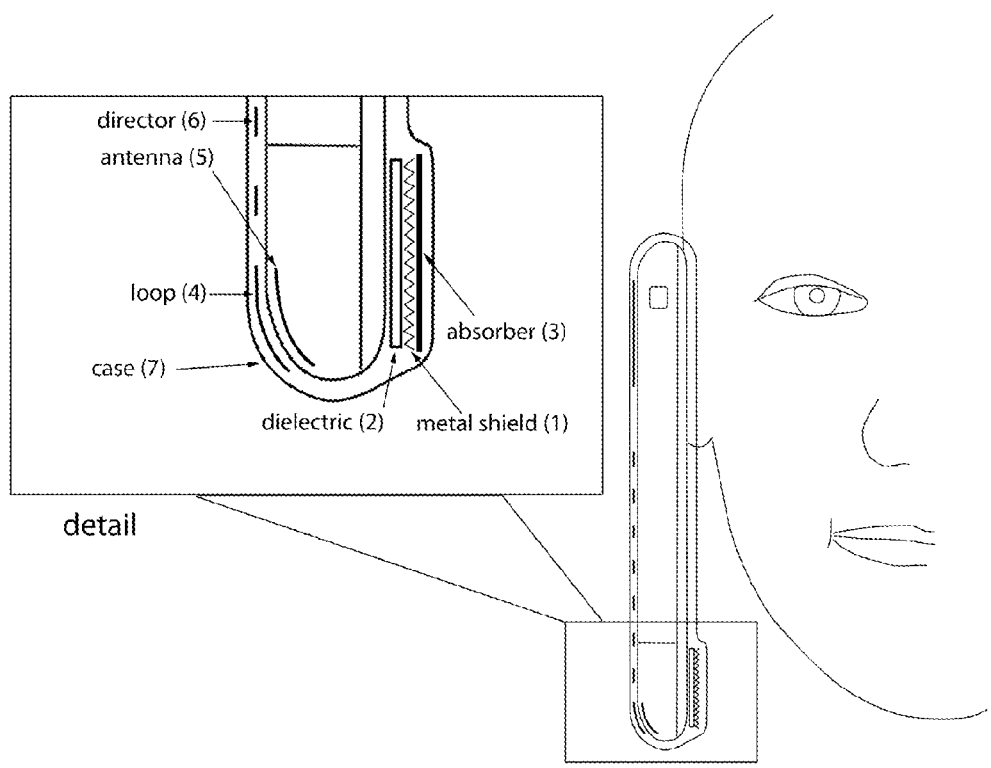
FIG. 9 shows a mobile telephone external case design including a reflective shield at the front side of the device and a radiation coupling device at the rear side of the device.
Figure 10:
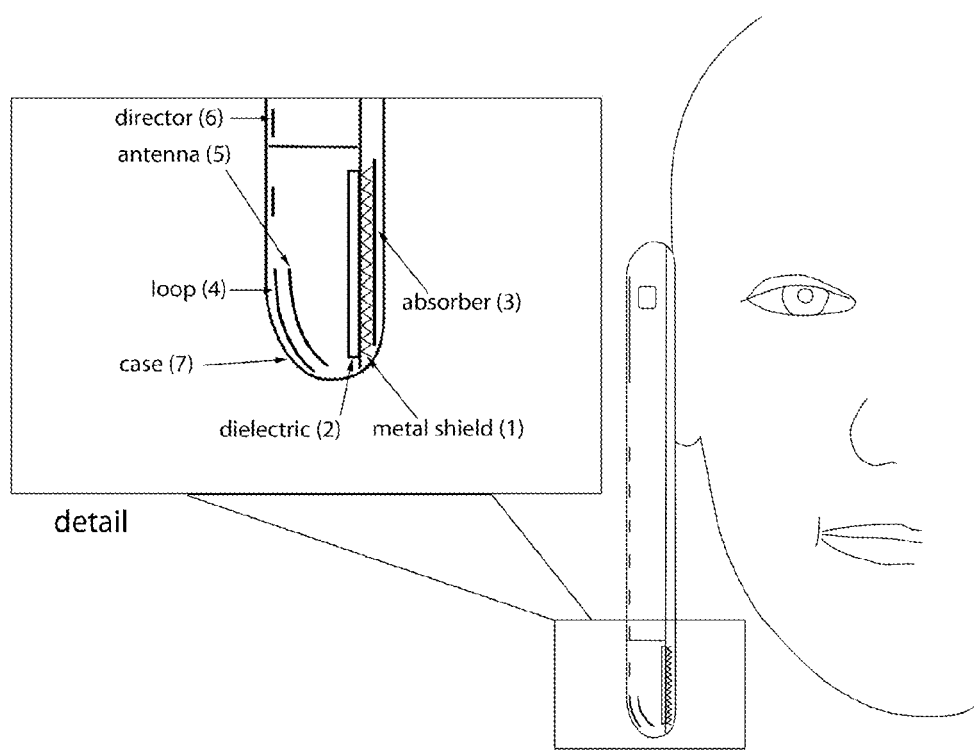
FIG. 10 shows an alternate embodiment of FIG. 9 wherein an RF redirection system is integrated into the internal design of a wireless device.

In another embodiment of the invention shown in FIGS. 9 and 10, a shield comprising a corrugated metallic surface is provided, either incorporated into a protective case (FIG. 9), or integrated directly into the body of the mobile communication device itself (FIG. 10). The metallic shield is located on the user side of the phone directly in front of the internal antenna. Such a shield also may be installed inside the cell phone. Such a corrugated surface gives rise to many image dipoles, thereby providing a wide pattern of scattered radiation. The particular shape and size of corrugations are designed to scatter radiation, which normally would be incident upon the user, in directions away from the user as widely as possible. In scientific terms the scattering angles from the incident wave vector could range from +/−40 to +/−180 degrees.

The corrugations generally should have sizes smaller than wavelengths of microwave frequencies transmitted from the wireless device. They therefore introduce scattering wave vectors that are greater than the incident wave vector in directions perpendicular to the incident wave vector. The purpose of the design of the corrugations is to deflect the radiation away from the user and at the same time avoid creating reflections back on the internal radiating antenna; as a result the impedance seen by the output amplifier of the wireless device, e.g. the cell phone, is not affected and the total radiated power of the phone is not reduced, while SAR is significantly reduced.

In this embodiment, the loop 4 and the directors 6 are positioned relative to the internal antenna 5 such that the loop is close to the antenna and couples the RF power out from the back of the phone and up to the directors 6.

As shown in FIG. 9, in a case 7, a layer of highly conductive corrugated metal shield material 1 is, optionally, combined with a layer of absorptive material 3 of a specific frequency range, placed on the side of the metallic shield opposite to the internal antenna, such that with the phone inserted into the external case the shield is positioned between the user's head and the internal antenna. The absorber 3 prevents any radiation that passed through the shield from reaching the user. Also, a layer of dielectric material 2 may be added between the internal antenna and the shield to reduce the spacing required to achieve an effective distance between the antenna and the shield of ¼ wavelength of the RF radiation.

The redirection of RF radiation away from the user's head also may be achieved by the use of a properly located passive RF coupling redirector 4-6 as shown in FIG. 9, in combination with the corrugated shield of highly conductive metallic material 1. An alternate embodiment as shown in FIG. 10 may have the RF redirector 4-6 and metallic shield 1 integrated within the wireless communication device itself.

A simplification of applying the radiation redirection and shielding can be by use of adhesive patches applied directly onto the area over the antenna; a first patch over the antenna on the side opposite the user (i.e., toward the cell tower) and a second patch between the antenna and the user. In this embodiment the beam antenna, the highly conducting corrugated shield and, optionally the frequency-targeted resonant absorptive layer, can be sandwiched between two non-conducting layers, one of which contains an adhesive surface to be applied directly onto the phone. The user will receive the protection whether the case is applied over it or not. It is apparent that this simplification can be applied to any case and to any phone. Appropriate covering might be necessary to secure this patch in place for more permanent application.

A main feature of this invention, both as a passive directional beam antenna alone, or in combination with a passive re-directional shield, incorporated in an external case for a wireless phone, or such combination incorporated internally in a wireless phone device, is that the invention directs/redirects radiation away from the user, out of the phone, reducing SAR (Specific Absorption Rate), without adversely affecting TRP (Total Radiated Power). It does this with a directional antenna, or a combination of a directional antenna and re-directive shield, or with a re-directive shield only, integrated within a case of non-conducting or low-conductive materials (variously of silicone, plastic, cloth, etc.) that allow EM waves to propagate outward toward the cell phone tower without suffering any attenuation.

Figure 11:
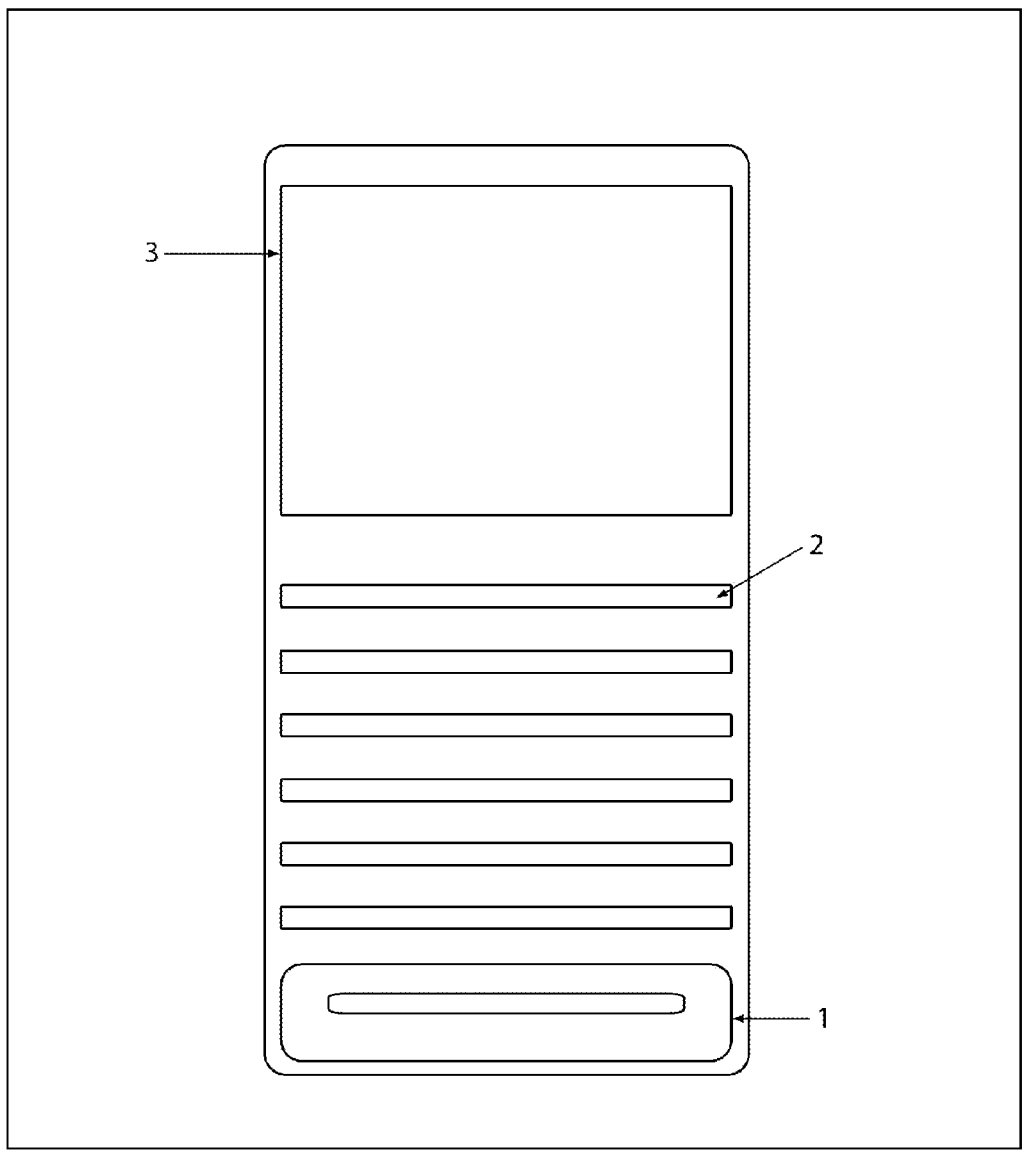
FIG. 11 shows an alternate embodiment of an RF loop design mounted on the back of a mobile telephone device.

A further alternate embodiment of the RF coupling radiation redirector is shown in FIG. 11. Here, a loop 1 consists of a metallic sheet with a narrow slot having a length and width tuned to ¼ of the wavelength of the transmitting RF radiation. For example, a 1900 MHz transmission would correspond to a 40 mm slot length.

What is claimed is:

1. An apparatus, comprising:
a wireless device having a housing and an internal antenna disposed within an interior of the housing, the housing having a proximal side and a distal side opposite the proximal side;
a first antenna element disposed outside of the interior of the housing and fixedly disposed relative to the distal side of the housing, the internal antenna being between the proximal side of the housing and the first antenna element, the first antenna element configured to be operatively coupled to the internal antenna to receive radiation from the internal antenna when the wireless device is operational; and
a second antenna element fixedly disposed relative to the distal side of the housing, the second antenna element configured to redirect the radiation from first antenna element when the wireless device is operational.

2. The apparatus of claim 1, wherein:
the first antenna element and the second antenna element are mounted on an external surface of the distal side of the housing.

3. The apparatus of claim 1, wherein:
the first antenna element and the second antenna element are mounted on an external surface of the distal side of the housing via an adhesive.

4. The apparatus of claim 1, wherein:
the distal side of the housing includes a first non-conductive material portion and a second non-conductive material portion,
the first antenna element and the second antenna element collectively disposed between the first non-conductive material portion and the second non-conductive material portion.

5. The apparatus of claim 1, wherein:
the first antenna element and the second antenna element are disposed within the distal side of the housing, the first antenna element and the second antenna element are disposed closer to the external surface of the distal side of the housing than an internal surface of the distal side of the housing.

6. The apparatus of claim 1, further comprising:
a third antenna element fixedly disposed relative to the distal side of the housing, the third antenna element configured to redirect the radiation from second antenna element when the wireless device is operational.

7. The apparatus of claim 1, wherein:
an external surface of the distal side of the housing being non-planar,
the first antenna element and the second antenna element being disposed collectively in a non-planar manner and being substantially parallel to the external surface of the distal side of the housing.

8. An apparatus, comprising:
a wireless device having a housing and an internal antenna disposed within an interior of the housing, the housing having a proximal side and a distal side opposite the proximal side; and
a plurality of antenna elements disposed outside of the interior of the housing and fixedly disposed relative to the distal side of the housing, the internal antenna being between the proximal side of the housing and at least one antenna element from the plurality of antenna elements, the plurality of antenna elements configured to be operatively coupled to the internal antenna,
the plurality of antenna elements collectively configured to receive radiation from the internal antenna and redirect the radiation from a user of the wireless device when the wireless device is operational.

9. The apparatus of claim 8, further comprising:
a first non-conductive material layer; and
a second non-conductive material layer,
the plurality of antenna elements collectively disposed between the first non-conductive material layer and the second non-conductive material layer, the second non-conductive material layer fixedly attached to the distal side of the housing.

10. The apparatus of claim 8, wherein:
the plurality of antenna elements include a first antenna element having a loop structure, a second antenna element having a strip structure and a third antenna element having a plate structure.

11. The apparatus of claim 8, wherein:
the plurality of antenna elements include a first antenna element having an irregular shape dimensioned to fit available space on an external surface of the distal side of the housing.

12. The apparatus of claim 8, wherein:
the plurality of antenna elements include a first antenna element, a second antenna element and a third antenna element,
the first antenna element having an irregular shape dimensioned to fit available space on an external surface of the distal side of the housing,
the second antenna element having a loop structure, and
the third antenna element having a strip structure.

13. An apparatus, comprising:
a wireless device having a housing and an internal antenna disposed within the housing, the housing having a proximal side and a distal side opposite the proximal side;
a first antenna element fixedly attached on an external surface of or disposed within the distal side of the housing, the first antenna element configured to be operatively coupled to the internal antenna to receive radiation from the internal antenna when the wireless device is operational; and
a second antenna element fixedly attached on an external surface of or disposed within the distal side of the housing, the second antenna element configured to redirect the radiation from first antenna element when the wireless device is operational.

14. The apparatus of claim 13, wherein:
the first antenna element defines a loop structure, and
the second antenna element defines a loop structure.

15. The apparatus of claim 13, wherein:
the first antenna element defines a loop structure elongate along a first axis, and
the second antenna element defines a loop structure elongate along a second axis substantially parallel to the first axis.

16. The apparatus of claim 13, wherein:
the first antenna element defines a loop structure, and
the second antenna element defines a strip structure.

17. The apparatus of claim 13, wherein:
the first antenna element defines a loop structure elongate along a first axis, and
the second antenna element defines a strip structure elongate along a second axis substantially parallel to the first axis.

18. The apparatus of claim 13, wherein:
the wireless device is elongate along a first axis, and
the first antenna element defines a strip structure elongate along a second axis substantially perpendicular to the first axis.

19. The apparatus of claim 13, wherein:
the wireless device is elongate along a first axis, and
the first antenna element defines a strip structure elongate along a second axis substantially parallel to the first axis.

20. The apparatus of claim 13, wherein:
the first antenna element defines a strip structure elongate along a first axis, and
the second antenna element defines a strip structure elongate along a second axis substantially perpendicular to the first axis.

* * * * *